United States Patent
Andersen et al.

(10) Patent No.: US 10,465,483 B2
(45) Date of Patent: Nov. 5, 2019

(54) DIGITAL CORE SENSITIVITY ANALYSIS

(71) Applicant: SCHLUMBERGER TECHNOLOGY CORPORATION, Sugar Land, TX (US)

(72) Inventors: Mark Andersen, Houston, TX (US); Denis Klemin, Houston, TX (US); Alexander Nikolaevich Nadeev, Spring, TX (US); Omer M. Gurpinar, Denver, TX (US); John Ratulowski, Edmonton (CA)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 354 days.

(21) Appl. No.: 14/911,708

(22) PCT Filed: Jul. 23, 2014

(86) PCT No.: PCT/US2014/047843
§ 371 (c)(1),
(2) Date: Feb. 11, 2016

(87) PCT Pub. No.: WO2015/023409
PCT Pub. Date: Feb. 19, 2015

(65) Prior Publication Data
US 2016/0194940 A1    Jul. 7, 2016

Related U.S. Application Data

(60) Provisional application No. 61/865,521, filed on Aug. 13, 2013, provisional application No. 61/912,464, filed on Dec. 5, 2013.

(51) Int. Cl.
*E21B 41/00* (2006.01)
*E21B 43/00* (2006.01)
(Continued)

(52) U.S. Cl.
CPC .......... *E21B 41/0092* (2013.01); *E21B 43/00* (2013.01); *E21B 43/16* (2013.01); *G06F 17/18* (2013.01)

(58) Field of Classification Search
CPC ...... E21B 41/0092; E21B 43/00; E21B 43/16; G06F 17/18
(Continued)

(56) References Cited

U.S. PATENT DOCUMENTS

2005/0149307 A1* 7/2005 Gurpinar ................ E21B 43/00
703/10
2009/0259446 A1  10/2009 Zhang et al.
(Continued)

FOREIGN PATENT DOCUMENTS

WO 2009126881 A2 10/2009
WO 2013009512 A2  1/2013

OTHER PUBLICATIONS

P.R. Cerasi, A.N. Berntsen J.F. Stenebraten, E. Papamichos, "Use of Volumentric Sand Production Tool on Field Data to help plan Oil Production Strategy" ARMA Oct. 29, 2010, 10 pages.*
(Continued)

*Primary Examiner* — Dwin M Craig
(74) *Attorney, Agent, or Firm* — Cameron R. Sneddon

(57) ABSTRACT

A method for performing simulation of a field having a subterranean formation, including: obtaining a three-dimensional (3D) porous solid image of a core sample, the core sample representing a portion of the field; generating a digital rock model from the solid image, the digital rock model describing a physical pore structure in the core sample; obtaining phase behavior data of fluids of the field; generating a digital fluid model of the fluids based on the phase behavior data, the digital fluid model describing a physical property of the fluid; performing, on a computer
(Continued)

system and based on the digital rock model and the digital fluid model, simulations of the field by varying an input parameter for the simulations; and analyzing an output parameter generated by the simulations to determine an effect of varying the input parameter on the output parameter.

14 Claims, 5 Drawing Sheets

(51) Int. Cl.
*E21B 43/16* (2006.01)
*G06F 17/18* (2006.01)

(58) Field of Classification Search
USPC .......................................................... 703/2
See application file for complete search history.

(56) References Cited

U.S. PATENT DOCUMENTS

| | | |
|---|---|---|
| 2011/0295580 A1 | 12/2011 | Sisk et al. |
| 2012/0209529 A1 | 8/2012 | Foot et al. |
| 2012/0221306 A1 | 8/2012 | Hurley et al. |
| 2012/0223235 A1 | 9/2012 | Maucec |
| 2012/0281883 A1 | 11/2012 | Hurley et al. |
| 2013/0018641 A1 | 1/2013 | Prisco et al. |

OTHER PUBLICATIONS

Examination Report issued in the related AU application 2014307046, dated May 26, 2017 (4 pages).
International Search Report and Written Opinion issued in the related PCT application PCT/US2014/047843, dated Nov. 11, 2014 (9 pages).
Extended Search Report issued in the related EP Application 14836155.3, dated Feb. 2, 2017 (6 pages).
Koroteev et al., Application of Digital Rock Technology for Chemical EOR Screening, SPE 165258 (2013) 12 pages.
Demianov, Alexander et al., "Density Functional Modelling in Multiphase Compositional hydrodynamics", 89 Canadian Journal of Chemical Engineering, (2011) vol. 89, Issue 2, pp. 206-226.
International Report on Patentability issued in related PCT application PCT/US2014/047843 dated Feb. 25, 2016, 6 pages.
Notice of Acceptance issued in the related AU application 2014307046, dated May 9, 2018 (4 pages).
Office Action issued in the related EP Application 14836155.3, dated Feb. 28, 2019 (7 pages).

* cited by examiner

DIGITAL CORE SENSITIVITY ANALYSIS

CROSS-REFERENCE TO RELATED APPLICATIONS

This application claims priority from U.S. Provisional Application 61/865,521, filed Aug. 13, 2013, and U.S. Provisional Application 61/912,464, filed Dec. 5, 2013, both of which are incorporated herein by reference in their entireties.

BACKGROUND

Field

Operations, such as geophysical surveying, drilling, logging, well completion, and production, are typically performed to locate and gather valuable downhole fluids. Surveys are often performed using acquisition methodologies, such as seismic mapping, and resistivity mapping, to generate images of underground formations. These formations are often analyzed to determine the presence of subterranean assets, such as valuable fluids or minerals, or to determine if the formations have characteristics suitable for storing fluids. Although the subterranean assets are not limited to hydrocarbons such as oil, throughout this document the terms "oilfield" and "oilfield operation" may be used interchangeably with the terms "field" and "field operation" to refer to a site where any types of valuable fluids or minerals can be found and the activities required to extract them. The terms may also refer to sites where substances are deposited or stored by injecting them into the subsurface using boreholes and the operations associated with this process. Further, the term "field operation" refers to a field operation associated with a field, including activities related to field planning, wellbore drilling, wellbore completion, and/or production using the wellbore.

Description of Related Art

Simulations are commonly used in the oil industry and other industries to model processes and predict behaviors. Each type of simulation is relevant to a certain scale of process. A common example in the oil industry is the use of reservoir flow models to predict dynamic behavior at the scale of a reservoir, which can be from a few meters to hundreds of meters thick and can be thousands of meters in lateral extent. The volume elements in these models are typically on the order of meters or tens of meters on a side. Reservoir scale processes, such as developed miscibility, can develop within the model.

At the other extreme, micromodels of porous media represent small pieces of the media, typically with volume elements on the order of a few microns for X-ray computed tomography at a micron scale resolution (microCT) or less (e.g., 100 times smaller for scanning electron microscope (SEM) imaging) on a side and full models that are on the order of millimeters or less in extent. In these models, the small size means the residence time of fluids within the model is too short for many processes to develop fully. The present disclosure is within the domain of these small models.

Static micromodels representing pore and grain geometry can be obtained in several ways at different scales. Thin sections of rocks are formed by injecting a colored epoxy into a rock and then slicing an optically thin section and mounting it onto a glass slide. This is optically analyzed to obtain images of the pores and grains. Multiple thin sections can be used to create a micromodel, typically using statistical distributions rather than making an image directly from stacked thin sections. Alternatively, a small rock volume can be scanned using X-rays in a microCT imaging machine. The tomographic inversion of the X-ray scans is used to create a static model of a rock with resolution ranging from tens of microns to tens of nanometers. This CT image is processed and segmented into grains and pores. A third method uses ion beam milling and scanning electron microscopy to create a series of images with nanometer-scale resolution. These images can be analyzed and used to construct a static three-dimensional (3D) model of a tiny portion of the rock.

Micromodels for flow-dynamic behavior in porous media are of a few types. Pore network models substitute a complex network of nodes and connectors to represent the pores and pore throats, respectively. The network is based on a static representation rock model, and flow dynamics are applied to the pore network. Lattice Boltzmann models are based on movement of particles on a three-dimensional grid, which can be placed within a static rock model. A third method uses microhydrodynamical modeling in a static rock model to represent simple or complex fluid-fluid and fluid-rock interactions during flow or while a chemical process develops.

All of these micromodels represent small portions of a real rock. Processes that require time, distance, or extensive gradients, for example of pressure or concentration, are not captured in such a simulation.

Laboratory measurements of rocks using techniques such as fractional flow analysis have been disclosed. Several coreflow simulators are available on the market, including SENDRA™, available from Weatherford Petroleum Consultants AS of Trondheim, Norway, CYDAR™, available from Cydarex of Rueil-Malmaison, France, and PoreLab™, available from Dr. Douglas Ruth of the University of Manitoba, Winnipeg, Manitoba, Canada. These coreflow simulators are not based on a structural model of the rock, but on analytical models that often assume homogeneity. Sensitivity to changes in parameters of these analytical models are simulated without considering the parameter changes at a pore and grain scale.

BRIEF SUMMARY OF THE DISCLOSURE

This summary is provided to introduce a selection of concepts that are further described below in the detailed description. This summary is not intended to identify key or essential features of the claimed subject matter, nor is it intended to be used as an aid in limiting the scope of the claimed subject matter.

Illustrative embodiments of the present disclosure are directed to a method and computer system for performing simulation of a field having a subterranean formation. The method involves operations including obtaining a three-dimensional (3D) porous solid image of a core sample, wherein the core sample is a 3D porous medium representing a portion of the field; generating a digital rock model from the 3D porous solid image, wherein the digital rock model describes a physical pore structure in the 3D porous medium; obtaining phase behavior data of fluids of the field; generating a digital fluid model of the fluids based on the phase behavior data, wherein the digital fluid model describes a physical property of the field; performing, based on the digital rock model and the digital fluid model, simulations of the field by varying an input parameter value for the simulations; and analyzing an output parameter generated by the simulations to determine an effect of varying the input parameter on the output parameter.

In one embodiment the simulations simulate injecting fluid into the portion of the field and include representing a plurality of sections of the portion of the field by a plurality of digital rock model instantiations; simulating a first section of the plurality of sections to generate a first effluent output, wherein the first section is simulated based at least on a first injection input and a first digital rock model instantiation of the plurality of digital rock model instantiations; and simulating a second section of the plurality of sections to generate a second effluent output, wherein the second section is simulated based on the first effluent output and a second digital rock model instantiation of the plurality of digital rock model instantiations, wherein a value of the output parameter generated by the plurality of simulations in based at least on the first effluent output and the second effluent output. The output parameter generated by the plurality of simulations may be displayed in a statistical chart.

A further embodiment may include determining, based on the effect of varying the input parameter value on the output parameter meeting a pre-determined criterion, a laboratory test condition, and performing a laboratory test on the core sample based on the laboratory test condition to generate a laboratory test result.

Also disclosed is a non-transitory computer-readable medium including instructions for performing the simulation of the field having a subterranean formation.

BRIEF DESCRIPTION OF THE DRAWINGS

The appended drawings illustrate several embodiments of digital core sensitivity analysis and are not to be considered limiting of its scope, for digital core sensitivity analysis may admit to other equally effective embodiments.

DETAILED DESCRIPTION

Figure 1:
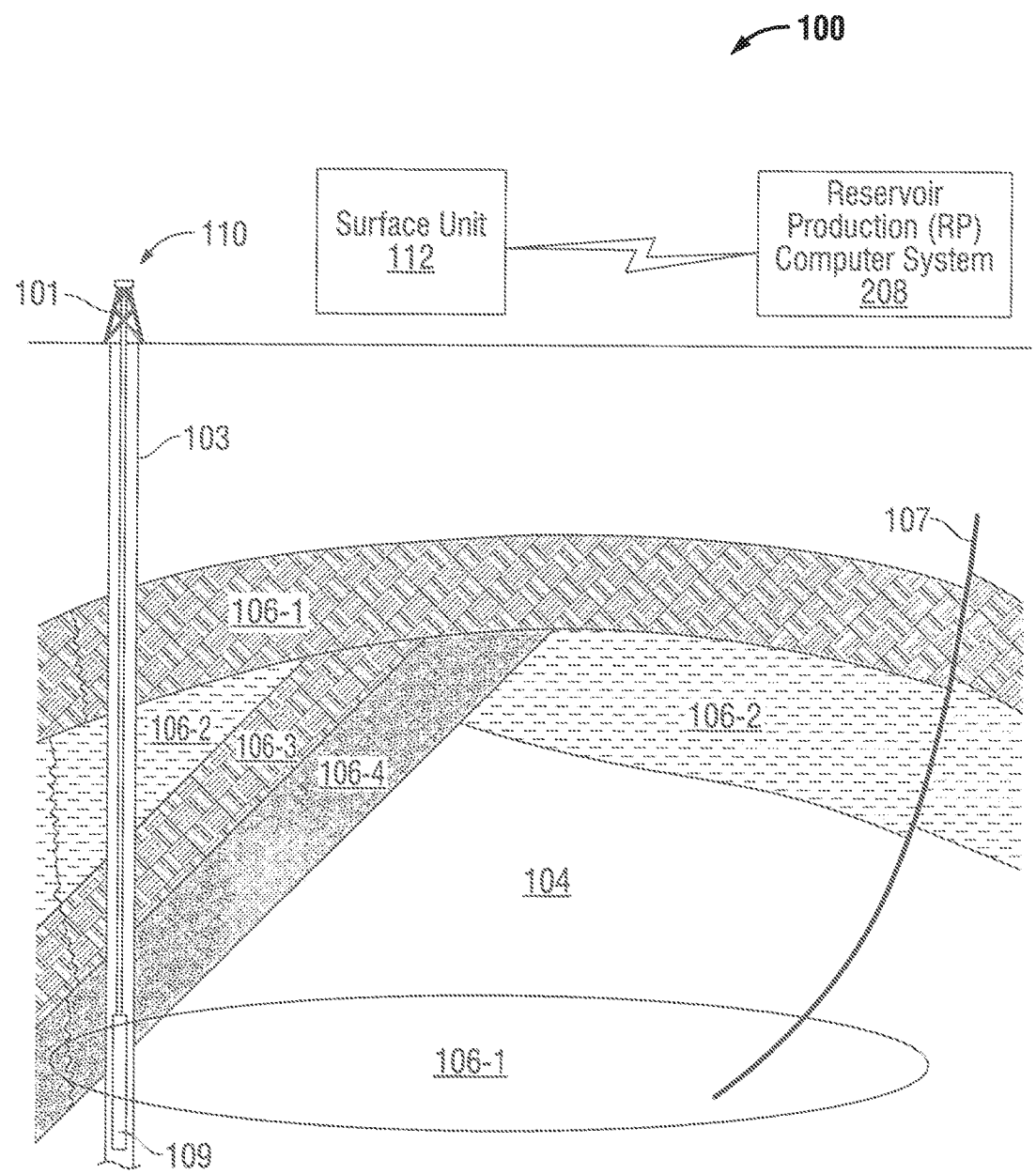
FIG. 1 is a schematic view, partially in cross-section, of a field in which one or more embodiments of digital core sensitivity analysis may be implemented.

Aspects of the present disclosure are shown in the above-identified drawings and described below. In the description, like or identical reference numerals are used to identify common or similar elements. The drawings are not necessarily to scale and certain features may be shown exaggerated in scale or in schematic in the interest of clarity and conciseness.

The term "digital rock model", as used in this application, refers to pore and grain level models, such as a micromodel, of a porous medium. The resolution of these models is typically in the range of a few microns or less. Fluid flow processes may be simulated in a digital rock model using various techniques. These fluid flow processes represent subterranean fluids that are native to a rock formation or injected into the rock formation. In particular, the subterranean fluids may include liquids, gases, injectants, or combinations thereof.

The term "core sample", as used in this application, refers to a 3D porous medium representing a portion of the oilfield. In particular, a core sample refers to a physical sample obtained from a portion of the oilfield. For example, the core sample may be obtained by drilling into the portion of the oilfield with a core drill to extract the core sample from the portion. The core sample may contain subterranean fluids, such as multiphase compositional fluids.

The term "equation of state" (EOS), as used in this application, refers to a thermodynamic equation describing the state of the subterranean fluids under a given set of physical conditions. The equation of state is a constitutive equation which provides a mathematical relationship between two or more state functions associated with the subterranean fluids. For example, the state functions may include temperature, pressure, volume, or internal energy.

The term "Helmholtz free energy", as used in this application, refers to a thermodynamic potential that measures the useful work obtainable from a closed thermodynamic system at a constant temperature. For example, the closed thermodynamic system may be the core sample or the subterranean fluids contained in the core sample. The Helmholtz free energy model refers to a mathematical model of the subterranean fluids based on the Helmholtz free energy which is a specific form of an EOS that relates the Helmholtz free energy to temperature and partial molar volume (which can be restated as molar density).

The term "digital core analysis" (DCA), as used in this application, refers to using the digital rock model and mathematical model of the subterranean fluids (referred to as a digital fluid model) to simulate a laboratory test that is applied to a core sample. For example, the laboratory test may include injecting fluid into the core sample according to a laboratory test procedure. Typically, the laboratory test is performed (i.e., applied to the core sample) to obtain measurements (i.e., laboratory test results or simply laboratory results) of the core sample. Such measurements are referred to as measured core sample data and correspond to physical evaluation of the core sample. In contrast, the results of DCA are referred to as DCA simulation results and correspond to digital evaluation (i.e., simulation) of the core sample.

The term "tornado chart", as used in this application, refers to a special type of bar chart, where the data categories are listed vertically instead of the standard horizontal presentation, and the categories are ordered so that the largest bar appears at the top of the chart, the second largest bar appears second from the top, and so on. Tornado charts are often used to display the variability of some important output parameter based on changes in input parameters. For example, oil recovery may be the output, with injection rates, injection fluid properties, or number of wells as variable inputs.

One or more aspects of digital core sensitivity analysis provide a workflow that incorporates a digital model of flow through a porous medium. The objective is to evaluate the range of results obtained when input parameters are varied. This evaluation is useful for determining the uncertainty and risk of field activities that do not exactly match the result of a single flow evaluation, whether that evaluation is done in a laboratory on a rock sample or using a digital representation of the rock sample and a mathematical model of the subterranean fluids in a digital flow evaluation. Results may then be presented in a tornado chart. This evaluation may also be used to determine an optimal laboratory test to perform.

FIG. 1 depicts a schematic view, partially in cross section, of a field 100 in which one or more embodiments of user sourced data issue management may be implemented. In one or more embodiments, one or more of the modules and elements shown in FIG. 1 may be omitted, repeated, and/or substituted. Accordingly, embodiments of user sourced data issue management should not be considered limited to the specific arrangements of modules shown in FIG. 1.

As shown in FIG. 1, a subterranean formation 104 includes several geological structures (106-1 through 106-4). As shown, the formation includes a sandstone layer 106-1, a limestone layer 106-2, a shale layer 106-3, and a sand layer 106-4. A fault line 107 extends through the formation. One or more of the geological structures (106-1 through 106-4) may be part of a reservoir (e.g., reservoir 106-5 of subterranean fluids. In one or more embodiments, various survey tools and/or data acquisition tools (e.g., data acquisition tool 109) are adapted to measure the formation and detect the characteristics of the geological structures of the formation and/or subterranean fluids contained in the geological structures.

Further, as shown in FIG. 1, the wellsite system 110 is associated with a rig 101, a wellbore 103, and other wellsite equipment and is configured to perform wellbore operations, such as logging, drilling, fracturing, production, or other applicable operations. Generally, survey operations and wellbore operations are referred to as field operations of the field 100. These field operations may be performed as directed by the surface unit 112.

In one or more embodiments, the surface unit 112 is operatively coupled to a reservoir production (RP) computer system 208 and/or the wellsite system 110. In particular, the surface unit 112 is configured to communicate with the RP computer system 208 and/or the wellsite system 110 to send commands to the RP computer system 208 and/or the wellsite system 110 and to receive data therefrom. For example, the wellsite system 110 may be adapted for measuring downhole properties using logging-while-drilling (LWD) tools and for obtaining core samples. In one or more embodiments, the surface unit 112 may be located at the wellsite system 110 and/or remote locations. The surface unit 112 may be provided with computer facilities for receiving, storing, processing, and/or analyzing data from the RP computer system 208, the wellsite system 110, or other parts of the field 100. The surface unit 112 may be provided with scanning and other laboratory facilities for obtaining 3D porous solid images of the core samples and/or performing laboratory tests on the core samples obtained by the wellsite system 110. The surface unit 112 may then send the 3D porous solid image and laboratory test results to the RP computer system 208 for analysis. The surface unit 112 may also be provided with functionality for actuating mechanisms at the field 100. The surface unit 112 may then send command signals to the field 100 in response to data received, for example to control and/or optimize various field operations described above.

In one or more embodiments, the data received by the surface unit 112 represents characteristics of the subterranean formation 104 and may include seismic data and/or information related to porosity, saturation, permeability, natural fractures, stress magnitude and orientations, or elastic properties during a drilling, fracturing, logging, or production operation of the wellbore 103 at the wellsite system 110.

In one or more embodiments, the surface unit 112 is communicatively coupled to the RP computer system 208. Generally, the RP computer system 208 is configured to analyze, model, control, optimize, or perform other management tasks of the aforementioned field operations based on the data provided from the surface unit 112. Although the surface unit 112 is shown as separate from the RP computer system 208 in FIG. 1, in other examples the surface unit 112 and the RP computer system 208 may be combined.

While a specific subterranean formation 104 with specific geological structures is described above, it will be appreciated that the formation may contain a variety of geological structures. Fluid, rock, water, oil, gas, and other geomaterials may be present in various portions of the formation 104. Further, one or more types of measurement may be taken at one or more locations across one or more fields or other locations for comparison and/or analysis using one or more acquisition tools.

Although many (e.g., hundreds) wells are typically present in a field, only a single well with a single well log is explicitly shown in the field 100 for clarity of illustration.

Figure 2:
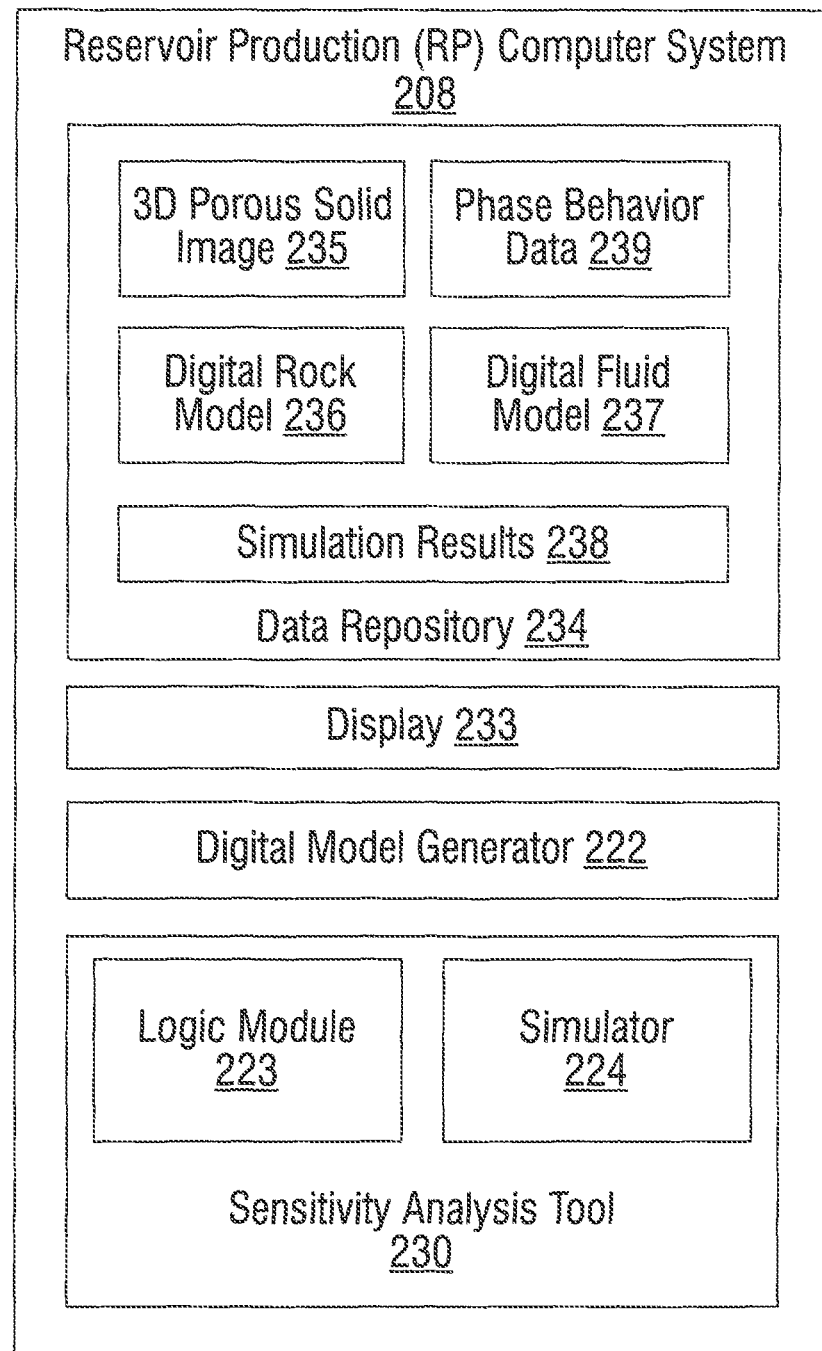
FIG. 2 shows a reservoir production computer system in accordance with one or more embodiments.

FIG. 2 shows more details of the RP computer system 208 in which one or more embodiments of digital core sensitivity analysis may be implemented. In one or more embodiments, one or more of the modules and elements shown in FIG. 2 may be omitted, repeated, and/or substituted. Accordingly, embodiments of digital core sensitivity analysis should not be considered limited to the specific arrangements of modules shown in FIG. 2.

As shown in FIG. 2, the RP computer system 208 includes a digital model generator 222, sensitivity analysis tool 230, data repository 234, and display 233. Each of these elements is described below.

In one or more embodiments, the digital model generator 222 is a tool for generating a digital rock model (e.g., digital rock model 236) and a digital fluid model (e.g., digital fluid model 237) for the field 100.

In one or more embodiments, the digital model generator 222 generates the digital rock model 236 based on a 3D porous solid image 235 of a core sample. The 3D porous solid image 235 is a 3D digital representation of the core sample that is generated using computed tomography (CT), scanning electron microscopy, focused ion beam scanning electron microscopy, confocal microscopy, or other suitable scanning means. Specifically, the 3D porous solid image 235 is an image of each portion of the core sample including pores and solid surfaces. Thus, the 3D porous solid image 235 may show pores and rock boundaries of the core sample for each layer of the core sample. In accordance with one or more embodiments, the 3D porous solid image 235 may be obtained with or without destroying the core sample in the process.

While the 3D porous solid image 235 may show the physical structure of the core sample, the digital rock model 236 may include the lithology of the core sample. For example, the lithographic properties of the core sample may include pore size distribution, rock type, tortuosity measurements, statistical results generated from the properties, and other information. To generate the digital rock model 236, digital processing and morphological analysis of the 3D porous solid image 235 may be performed. Specifically, consecutive application of image filtering, segmentation, and multiple property recognition may be used to obtain the digital rock model 236 from the 3D porous solid image 235. Morphological and geometrical statistical property analysis may further be performed to obtain information, such as pore size distribution, local and average tortuosity measurement, grain size distribution, and other properties of the core sample.

In one or more embodiments, the digital model generator 222 generates the digital fluid model 237 based on the phase behavior data 239 of subterranean fluids of the field 100. For example, the subterranean fluids may be extracted from the core sample and may be native to the rock formation or previously injected into the rock formation. In particular, the phase behavior data 239 represent measured properties of the subterranean fluids. For example, the phase behavior data 239 may be obtained from laboratory fluid characterization based on the specific protocols complemented by the workflows for laboratory data processing. Laboratory fluid measurements may include different measurement techniques, laboratory equipment, and operating protocols to measure properties that include but are not limited to the following:

(i) Pressure/volume/temperature (PVT) behavior in a multiphase system, such as a two-phase compositional system (e.g., gas-oil system, oil-water-solvent system, etc.), a three-phase compositional system (e.g., gas-water-hydrate system, water-oil-microemulsion system, etc.), etc.;

(ii) Fluid-fluid and fluid-solid surface phenomena, such as interfacial tension (IFT), surfactants, adsorption, wetting angles, etc.;

(iii) Rheological properties, such as shear and volume viscosity, non-linear viscous effects, viscoelasticity, viscoelasticity, etc.

TABLE 1 lists example laboratory analyses that may be performed to generate these measured properties that are saved in the data repository 234 as the phase behavior data 239.

TABLE 1

Standard PVT Tests

Composition, molecular weight, and density
Multiple and single stage flash data (separator tests)
Density, compressibility, and viscosity measurements
Constant composition expansion
Differential liberation
Constant volume depletion
Solvent/Gas Studies Swelling test pressure versus composition (P-x) diagram
Single contact vapor-liquid equilibrium (VLE) experiments including phase compositions and physical properties
Forward and backward multi-contact experiments
Slimtube, rising bubble, or other developed miscibility tests
Density, compressibility, and viscosity measurements
Interfacial tension measurements
Chemical/Polymer Studies Surfactant/brine/oil phase behavior studies
Interfacial tension measurements
Rheological measurements
Density and compressibility measurements.

In one or more embodiments, the digital fluid model 237 may be an EOS model or a Helmholtz free energy model described above.

In one or more embodiments, the sensitivity analysis tool 230 includes software instructions stored in a memory and executed on a computer processor to communicate with the surface unit 112 for receiving data (e.g., the 3D porous solid image 235 and phase behavior data 239) therefrom and to manage (e.g., analyze, model, control, optimize, or perform other management tasks) the aforementioned field operations based on the received data. One or more field operation management tasks (e.g., analysis task, modeling task, control task, optimization task, etc.) may be performed based on the results of the sensitivity analysis tool 230. In particular, the digital rock model 236 and digital fluid model 237 are used, continuously or intermittently, to perform simulations and generate preliminary and final results that are stored and displayed to the user. For example, the preliminary and final results may include the simulation results 238 that are selectively displayed to the user using the display 233. In one or more embodiments, the display 233 may be a two-dimensional (2D) display, a 3D display, or other suitable display device. The processor and memory of the RP computer system 208 are not explicitly depicted in FIG. 2 so as not to obscure other elements of the RP computer system 208. An example of such processor and memory is described in reference to FIG. 5 below.

In one or more embodiments, the sensitivity analysis tool 230 includes the simulator 224 that is configured to perform, based on the digital rock model 236 and the digital fluid model 237, a number of simulations of the field 100 by varying an input parameter value for each of the simulations. In one or more embodiments, the digital fluid model may be an equation of state model or may be based on the Helmholtz free energy model which may be constructed directly from the phase behavior data 239, correlated phase behavior data, or the equation of state model. The simulator 224 may use the Density Functional (DF) method for complex pore-scale hydrodynamics. In one or more embodiments, the simulation of the field 100 may include simulation of the entire field 100 or modeling engineering parameters used for operations of the field 100. For example, the simulations may simulate electrical resistivity, geomechanical properties, multiphase flow, etc. of the geological structures (106-1 through 106-4) and/or the reservoir 106-5 depicted in FIG. 1 above. In particular, the multiphase flow simulation may include two-phase (e.g., oil-water, gas-water, gas-oil) or three-phase (e.g., oil-water-gas) miscible, near-miscible, and/or immiscible flow simulations. In addition, the fluid analysis may include surface phase and thin film dynamics at multiphase flow, chemical enhanced oil recovery (EOR), low salinity flow analysis, etc.

The input parameters of the simulations may include rock properties, fluid properties, and/or boundary conditions at the rock/fluid surface. Examples of the input parameter value to be varied include fluid pressures, boundary or confining pressures, differential pressures, temperatures, flow rates of various fluid phases, fluid compositions, fluid rheology, fluid phase conditions and behavior, mobile solid composition and concentration, interfacial tensions, rock material electrical and geomechanical properties and their distribution within the sample, surface tensions and their distribution within the sample for each particular fluid phase, wettability, changes in any of these properties or conditions during the simulated test, etc.

As noted above, the digital rock model 236 may be a micromodel covering a substantially smaller size of the rock compared to the entire rock sample. In one or more embodiments, the simulator 224 performs each of the simulations using multiple digital rock model instantiations to represent contiguous sections of the field. An example of using multiple digital rock model instantiations to represent contiguous sections of the field for performing the simulations is described in reference to FIG. 4 below.

In one or more embodiments, the sensitivity analysis tool 230 includes the logic module 223 that is configured to analyze an output parameter generated by the number of simulations to determine an effect of varying the input parameter value on the output parameter. One or more output parameters of the simulation may be chosen to use as the basis of comparison between the simulations. Each simulation varies a single input parameter from the base case while multiple simulations are performed using different values of this single input parameter.

In one or more embodiments, the logic module 223 is configured to present the results from these simulations in a statistical chart, such as a tornado chart or other means of presentation. In the tornado chart, the simulations are compared to a chosen base case and displayed as increases or decreases in the output parameter as an individual input parameter is varied. Overall, the presented results provide insight into the important variables involved in the modeled process. Specifically, those input parameters whose variations result in more pronounced effects on a particular output parameter are considered as the important variables involved in the process that is modeled by the simulations. In one or more embodiments, one or more of these important variables may be used to determine optimal parameters for the laboratory experiments on a rock sample. For example, laboratory sensitivity analysis may be streamlined based on the important variables identified above. For example, the input parameters that are not considered important based on the simulations may be excluded from the laboratory sensitivity analysis to reduce the laboratory sensitivity analysis turnaround time.

In one or more embodiments, a field operation may then be performed based on the intermediate or final results of the sensitivity analysis tool 230. For example, these results may be used to predict downhole conditions, and make decisions concerning oilfield operations. Such decisions may involve well planning, well targeting, well completions, operating levels, production rates, and other operations and/or conditions. Often this information is used to determine when to drill new wells, re-complete existing wells, or alter wellbore production.

One or more embodiments of the RP computer system 208 and examples of the preliminary and final results generated thereby are described below.

Digital Core Analysis Workflow

The digital core analysis sensitivity experiments are designed to optimize the design of laboratory core analysis tests. A digital rock evaluation is effective for examining the effect of variations of flow conditions, since the rock structure will remain the same from test to test and only user-defined changes affect the resulting displacement efficiency. The first stage is to obtain digital rock models and analyze the pore and grain space. The second digital stage evaluates different scenarios, which would be difficult and time-consuming to do in the laboratory. The first scenario evaluates the effect of wetting condition on recovery. The next scenario considers the effect of flow rate on recovery, using half and double the expected flow rate far from a wellbore in the field. Finally, the effect of lower gas/oil interfacial tension is evaluated by considering two low interfacial tension conditions (1 and 0.01 dyne/cm). This provides an evaluation of near-miscible behavior.

Work Plan Detail

Stage 1: Obtain Rock Model and Evaluate Microstructure

This procedure characterizes the rock samples and obtains and characterizes the rock models.

1. Obtain dual energy CT scan at 0.5 mm nominal resolution of all core plug samples prior to any other work.
2. Perform heterogeneous rock analysis (HRA, such as TerraTek HRA™ available from Schlumberger Technology Corporation of Salt Lake City, Utah, USA) on all plugs scanned.
3. Use HRA evaluation to select samples for core flood tests and for digital rock analysis to represent each rock type.
4. Cut microCT plugs (8 mm by 8 mm cylinders) of samples from each of the most important rock types.
5. Obtain microCT scans.
6. Build digital rock models.
7. Determine routine porosity and permeability.
8. Determine digital porosity and axial permeability.
9. Evaluate microstructure of rock models.

This provides histograms of grain and pore size distributions, preferred orientation, grain and pore sphericity, and pore connectivity.

10. Determine representative elementary volume or area (REV/REA) for determined microstructural parameters.
11. Report.

Stage 2: Perform Wettability Sensitivity Study

This procedure examines the effect of wetting as the formation wettability varies from strongly water wet to weakly water wet to weakly oil wet.

1. Use digital fluid properties representative of the reservoir.
2. Establish initial water saturation condition (Swi) in digital rock model.
3. Use representative boundary conditions (reservoir temperature and pressure) and a field flow rate of R-field.
4. Obtain result for strongly wetting system using unsteady state relative permeability with water displacing oil (USSw-o relK), i.e. water saturation is increasing, oil saturation is decreasing, test.
5. From initial condition, simulate USSw-o relK from Swi for weakly water-wet condition.
6. From initial condition, simulate USSw-o relK from Swi for weakly oil-wet condition.
7. Compare the three wetting conditions recovery.
8. Report.

Stage 3: Scenario Evaluations of Relative Permeability

This evaluation provides an indication of the change in properties at various conditions.

Stage 3a: Base Conditions

Define conditions for scenario evaluations.

1. Define digital fluid model for reservoir conditions and oil, brine, and gas.
2. Start all simulations from Swi.
3. Perform steady state relative permeability with water displacing oil (SSw-o relK) simulation from Swi.
4. Perform steady state relative permeability with gas displacing oil (SSg-o relK) simulation from Swi.
5. Perform USSw-o relK simulation from Swi.
6. Perform unsteady state relative permeability with gas displacing oil (USSg-o relK) simulation from Swi.
7. Compare steady state (SS) and unsteady state (USS) displacements.

Stage 3b: Effect of Variable Flow Rate

Examine the effect of changing the flow rate by doubling it and reducing it by half.

Lab Rate

1. Use rock model at Swi.
2. Use representative boundary conditions (reservoir temperature and pressure) and a field flow rate of R-field.
3. Use digital fluid model as previously defined.
4. Use USSw-o relK from Swi from Stage 3a, item 5.

Half Lab Rate

1. Use rock model at Swi.
2. Use representative boundary conditions (reservoir temperature and pressure) and a field flow rate of R-field/2.
3. Use digital fluid model as previously defined.
4. Simulate USSw-o relK from Swi.

Double Lab Rate
1. Use rock model at Swi.
2. Use representative boundary conditions (reservoir temperature and pressure) and a field flow rate of R-field*2.
3. Use digital fluid model as previously defined.
4. Simulate USSw-o relK from Swi.

Compare recovery efficiencies and relative permeability curves for R-field, R-field/2 and R-field*2.

Stage 3c: Effect of Variable Gas-Oil Interfacial Tension (IFT)

This scenario examines the effect of lower gas/oil interfacial tension and the effect of near-miscible displacement.
1. Use rock model at Swi.
2. Use representative boundary conditions (reservoir temperature and pressure) and a field flow rate of R-field.
3. Use digital fluid model as previously defined for base case only.

Base Case
4. Base case of USSw-o relK taken from Stage 3a, item 5.
5. Simulate unsteady state relative permeability with gas displacing water and oil (USSg-w/o relK) from end of item 4.

Low IFT=1 Dyne/Cm
6. Define digital fluid model with gas/oil IFT of 1 dyne/cm, remaining in immiscible flow regime.
7. Starting condition is Swi.
8. Simulate USSw-o relK from Swi with new fluid model.
9. Simulate USSg-w/o relK starting from item 8.

Very Low IFT=0.01 Dyne/Cm
10. Define digital fluid model with gas/oil IFT of 0.01 dyne/cm, remaining in immiscible flow regime.
11. Starting condition is Swi.
12. Simulate USSw-o relK from Swi with new fluid model.
13. Simulate USSg-w/o relK starting from item 12.

Compare results of flooding at different IFT values.
Report.

As shown in FIG. 2, the data repository 234 is configured to store the 3D porous solid image 235, the phase behavior data 239, the digital rock model 236, the digital fluid model 237, and the simulation results 238. The data repository 234 may be a data store such as a database, a file system, one or more data structures (e.g., arrays, link lists, tables, hierarchical data structures, etc.) configured in a memory, an extensible markup language (XML) file, any other suitable medium for storing data, or any suitable combination thereof. The data repository 234 may be a device internal to the RP computer system 208. Alternatively, the data repository 234 may be an external storage device operatively connected to the RP computer system 208.

Figure 3:
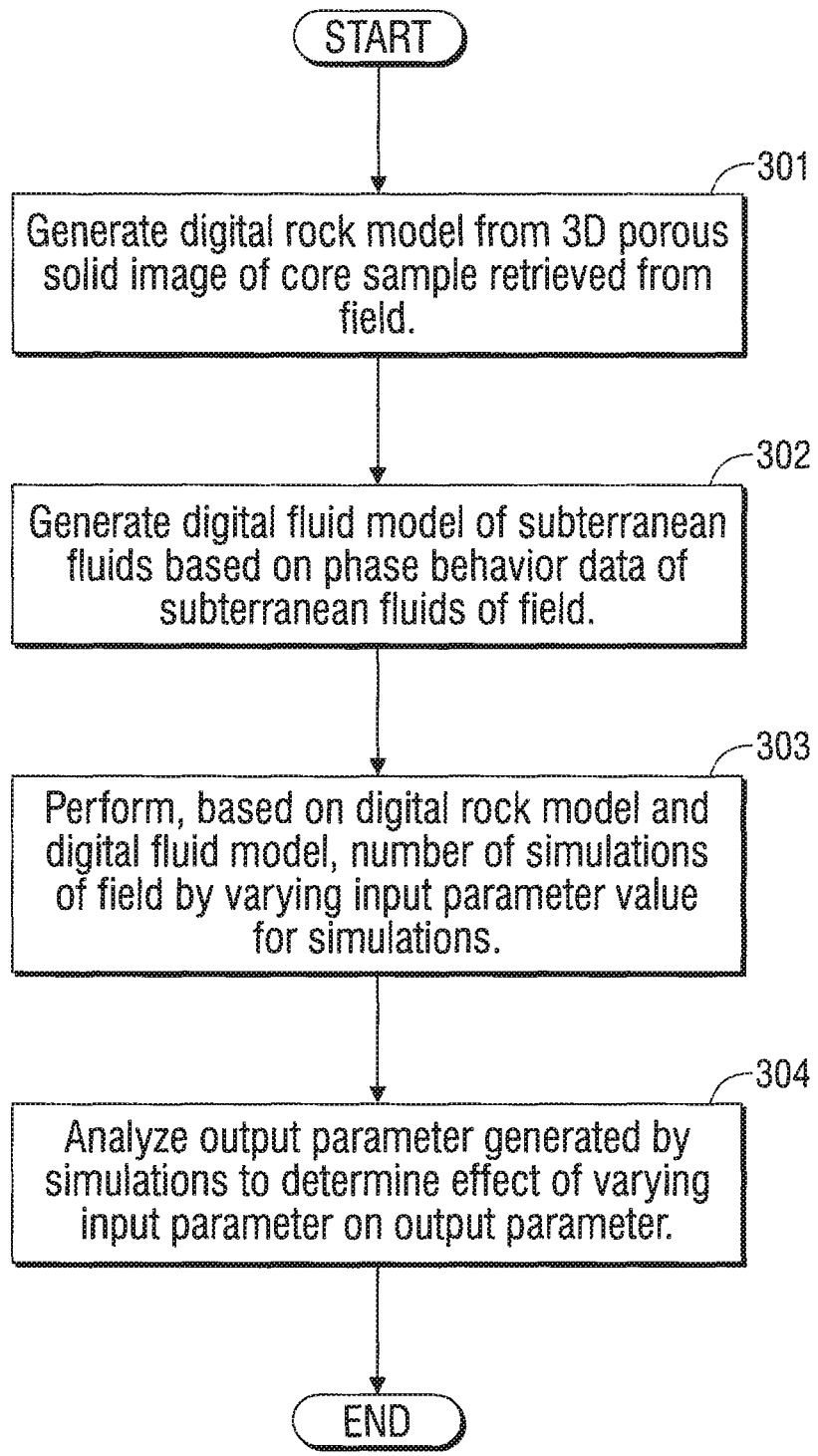
FIG. 3 shows a flowchart of a method in accordance with one or more embodiments.

FIG. 3 depicts an example method for digital core sensitivity analysis in accordance with one or more embodiments. In one or more embodiments, the example method is used to perform reservoir modeling for sensitivity evaluation of properties and conditions in an oil or gas field. The result may then be presented as a tornado chart, which indicates the range of result obtained when changing a single parameter through a reasonable range of input values or conditions.

In one or more embodiments, the method depicted in FIG. 3 may be practiced using the RP computer system 208 described in reference to FIGS. 1 and 2 above.

In one or more embodiments, one or more of the elements shown in FIG. 3 may be omitted, repeated, and/or performed in a different order. Accordingly, embodiments of the present workflow should not be considered limited to the specific arrangements of elements shown in FIG. 3.

Initially in 301, a digital rock model is generated from a three-dimensional (3D) porous solid image of a core sample. The core sample is a 3D porous medium representing a portion of the field. In particular, the digital rock model describes a physical pore structure in the 3D porous medium.

In 302, a digital fluid model of the subterranean fluids is generated based on phase behavior data of subterranean fluids of the field. In particular, the digital fluid model describes a physical property of the fluid. In one or more embodiments, the digital fluid model is an EOS model or a Helmholtz free energy model.

In 303, a number of simulations of the field are performed based on the digital rock model and the digital fluid model. Specifically, the simulations are performed by varying one or more input parameter values for each of the simulations. In one or more embodiments, the simulation is performed based on the hydrodynamic equations found in Alexander Demianov et al., "Density Functional Modelling in Multiphase Compositional Hydrodynamics", 89 Canadian Journal of Chemical Engineering, 206, 211-12 (April 2011) and D. Koroteev, et al., "Application of Digital Rock Technology for Chemical EOR Screening", SPE-165258, 2013.

As noted above, the digital rock model may be a micro-model covering a substantially smaller size of the rock compared to the scale of the field being simulated. In one or more embodiments, each of the simulations is performed using multiple digital rock model instantiations to represent contiguous sections of the field. An example of using multiple digital rock model instantiations to represent contiguous sections of the field for performing the simulations is described in reference to FIG. 4 below.

In 304, an output parameter generated by the simulations is analyzed to determine an effect of varying the input parameter on the output parameter. In one or more embodiments, the output parameter generated by the simulations is displayed in a statistical chart, such as a tornado chart. Further, based on the effect of varying the input parameter value on the output parameter meeting a pre-determined criterion, a laboratory test condition related to the input parameter may be determined. Accordingly, a laboratory test may be performed on a rock sample based on the laboratory test condition to generate a laboratory test result. For example, the laboratory test result may be used to predict downhole conditions, and make decisions concerning oilfield operations. Such decisions may involve well planning, well targeting, well completions, operating levels, production rates, and other operations and/or conditions. Often this information is used to determine when to drill new wells, re-complete existing wells, or alter wellbore production.

Figure 4:
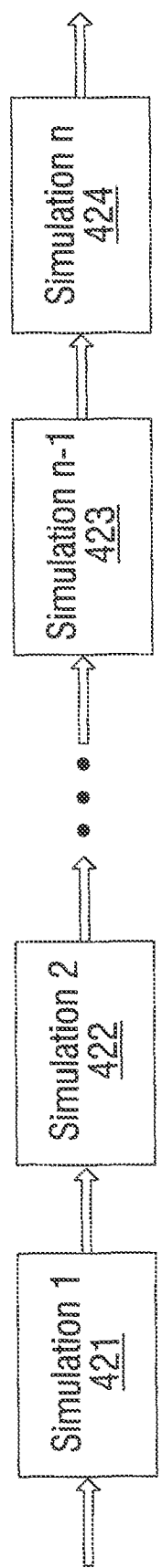
FIG. 4 shows an example diagram in accordance with one or more embodiments.

FIG. 4 shows an example diagram in accordance with one or more embodiments. The example diagram is for explanatory purposes only and not intended to limit the scope of the claims. As shown in FIG. 4, the example diagram illustrates a workflow that allows modeling of core sample fluid injection that has a time or distance scale larger than the range covered by a digital rock model. In this example workflow, multiple simulations (e.g., Simulation 1 421, Simulation 2 422, Simulation n-1 423, Simulation n 424, etc.) are performed sequentially based on respective instantiations of the digital rock model. In one example scenario, each simulation has an identical starting point of the digital rock model instantiation and fluid saturation locations within the digital rock model instantiation. A fluid is injected into the first digital rock model instantiation and the flow is simulated for a period of time. The time evolutions of the saturation distributions in the first digital rock model instantiation and of the effluent are recorded. This may be done for a specified time or number of simulation time steps, or until the effluent or the digital rock model or both reach equilibrium. The effluent from Simulation 1 421 is used, either directly or after some manipulation, as input to the second digital rock model instantiation for Simulation 2 422. The flow process is simulated in this second digital rock model instantiation and the time evolutions of the saturation distributions and the effluent are recorded as during Simulation 1 421. The effluent of Simulation 2 422 is then used as input for the subsequent simulation, and so on through as many simulations (e.g., Simulation n−1 423, Simulation n 424) as are necessary to model the core sample fluid injection through the time or distance scale. The core sample fluid injection may be evaluated through both the evolution of the effluent and the variations in final states of each simulation.

In another example scenario of this workflow, each simulation uses a different starting digital rock model instantiation, which may differ either in the fluid distributions within the digital rock model instantiation or in the digital rock model instantiation itself, or both. The workflow may then proceed as described above.

In either of the two example scenarios of the workflow, additional manipulations of the effluent from one simulation may be performed before using such as input into the next simulation. This may involve, for example, extrapolation of fluid property changes beyond those observed in an individual simulation by use of an equation of state model for the fluid.

Figure 5:
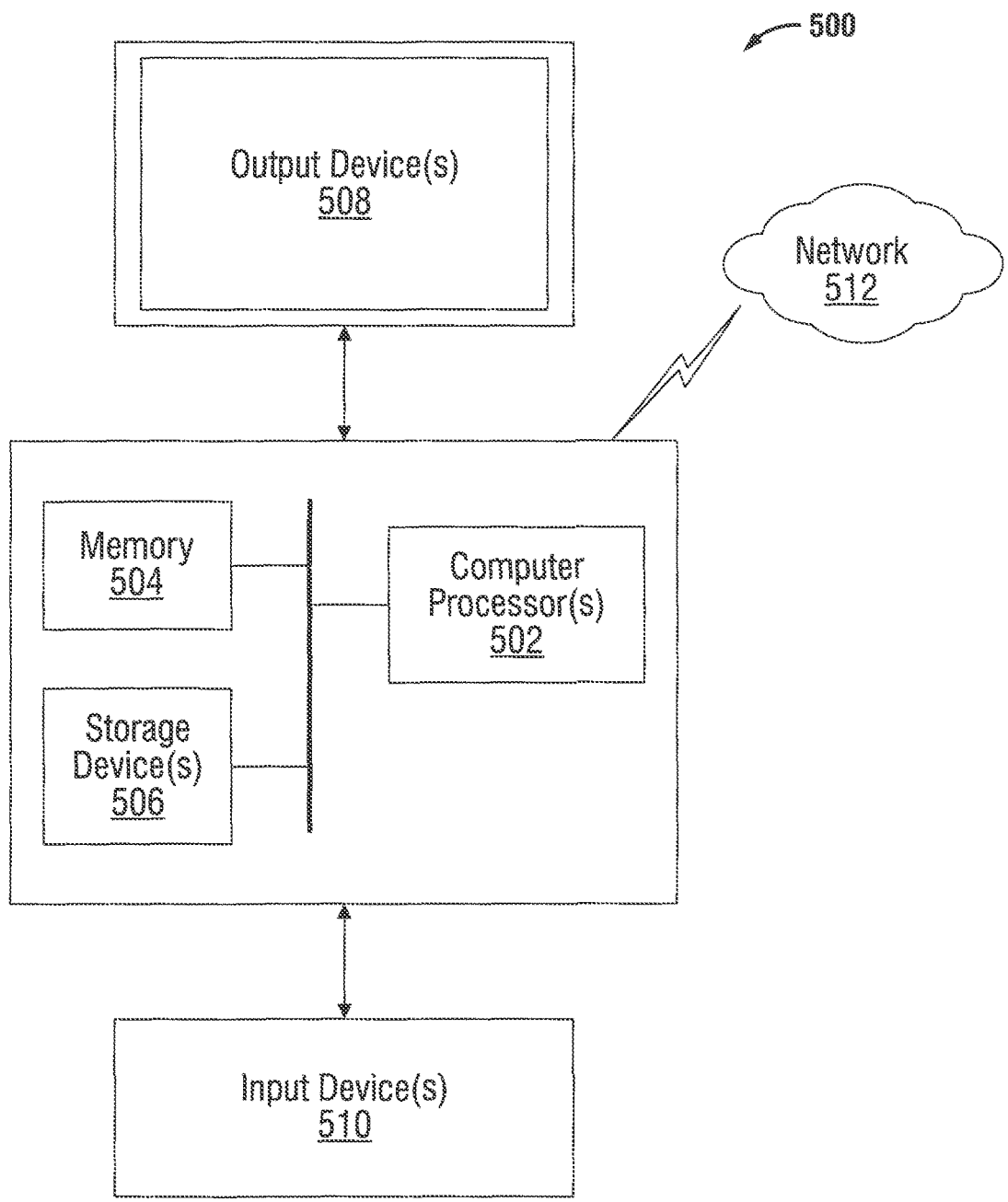
FIG. 5 shows a computing system in accordance with one or more embodiments.

Embodiments of digital core sensitivity analysis may be implemented on virtually any type of computer regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of digital core sensitivity analysis. For example, as shown in FIG. 5, the computing system 500 may include one or more computer processor(s) 502, associated memory 504 (e.g., random access memory (RAM), cache memory, flash memory, etc.), one or more storage device(s) 506 (e.g., a hard disk, an optical drive such as a compact disk (CD) drive or digital versatile disk (DVD) drive, a flash memory stick, etc.), and numerous other elements and functionalities. The computer processor(s) 502 may be an integrated circuit for processing instructions. For example, the computer processor(s) may be one or more cores, or micro-cores of a processor. The computing system 500 may also include one or more input device(s) 510, such as a touchscreen, keyboard, mouse, microphone, touchpad, electronic pen, or any other type of input device. Further, the computing system 500 may include one or more output device(s) 508, such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device. The computing system 500 may be connected to a network 512 (e.g., a local area network (LAN), a wide area network (WAN) such as the Internet, mobile network, or any other type of network) via a network interface connection. The input and output device(s) may be locally or remotely (e.g., via the network 512) connected to the computer processor(s) 502, memory 504, and storage device(s) 506. Many different types of computing systems exist, and the aforementioned input and output device(s) may take other forms.

Software instructions in the form of computer readable program code to perform embodiments of digital core sensitivity analysis may be stored, in whole or in part, temporarily or permanently, on a non-transitory computer readable medium such as a CD, DVD, storage device, diskette, tape, flash memory, physical memory, or any other computer readable storage medium. Specifically, the software instructions may correspond to computer readable program code that when executed by computer processor(s), is configured to perform embodiments of the present workflow.

Further, one or more elements of the aforementioned computing system 500 may be located at a remote location and connected to the other elements over a network 512. Further, embodiments of digital core sensitivity analysis may be implemented on a distributed system having a plurality of nodes, where each portion of the workflow may be located on a different node within the distributed system. In one embodiment of digital core sensitivity analysis, the node corresponds to a distinct computing device. The node may correspond to a computer processor with associated physical memory. The node may correspond to a computer processor or micro-core of a computer processor with shared memory and/or resources.

The systems and methods provided relate to the acquisition of hydrocarbons from an oilfield. It will be appreciated that the same systems and methods may be used for performing subsurface operations, such as mining, water retrieval, and acquisition of other underground fluids or other geomaterials from other fields. Further, portions of the systems and methods may be implemented as software, hardware, firmware, or combinations thereof.

While digital core sensitivity analysis has been described with respect to a limited number of embodiments, those skilled in the art, having benefit of this disclosure, will appreciate that other embodiments can be devised which do not depart from the scope of digital core sensitivity analysis as disclosed herein. Accordingly, the scope of digital core sensitivity analysis should be limited only by the attached claims.

What is claimed is:

1. A method for performing simulation of a field having a subterranean formation, comprising:
obtaining a three-dimensional (3D) porous solid image of a core sample, wherein the core sample is a 3D porous medium representing a portion of the field;
generating a digital rock model from the 3D porous solid image, wherein the digital rock model describes a physical pore structure in the 3D porous medium;
obtaining phase behavior data of fluids of the field;
generating a digital fluid model of the fluids based on the phase behavior data, wherein the digital fluid model describes a physical property of the fluid;
performing, by a processor of a computer system and based on the digital rock model and the digital fluid model, a plurality of simulations of the field by varying an input parameter value for the plurality of simulations;
analyzing an output parameter generated by the plurality of simulations to determine an effect of varying the input parameter value on the output parameter; and
performing or modifying a field operation based on the effect of varying the input parameter value on the output parameter, wherein the field operation is well planning, well targeting, well completion, operating levels, or production rates.

2. The method of claim 1, wherein the plurality of simulations simulates injecting fluid into the portion of the field and comprises:
representing a plurality of sections of the portion of the field by a plurality of digital rock model instantiations;
simulating a first section of the plurality of sections to generate a first effluent output, wherein the first section is simulated based at least on a first injection input and a first digital rock model instantiation of the plurality of digital rock model instantiations; and
simulating a second section of the plurality of sections to generate a second effluent output, wherein the second section is simulated based on the first effluent output and a second digital rock model instantiation of the plurality of digital rock model instantiations,
wherein a value of the output parameter generated by the plurality of simulations is based at least on the first effluent output and the second effluent output.

3. The method of claim 1, further comprising:
displaying the output parameter generated by the plurality of simulations in a statistical chart.

4. The method of claim 1, further comprising:
determining, based on the effect of varying the input parameter value on the output parameter meeting a pre-determined criterion, a laboratory test condition; and
performing a laboratory test on the core sample based on the laboratory test condition to generate a laboratory test result.

5. The method of claim 1, wherein the field operation is well planning, well targeting, well completions, operating levels, production rates, drilling new wells, re-complete existing wells, and/or alter wellbore production.

6. A method for performing simulation of a field having a subterranean formation, comprising:
a processor and memory; and
a tool stored in the memory, executing on the processor, and comprising:
a digital model generator configured to:
obtain a three-dimensional (3D) porous solid image of a core sample, wherein the core sample is a 3D porous medium representing a portion of the field;
generate a digital rock model from the 3D porous solid image, wherein the digital rock model describes a physical pore structure in the 3D porous medium;
obtain phase behavior data of fluids of the field; and
generate a digital fluid model of the fluids based on the phase behavior data, wherein the digital fluid model describes a physical property of the fluid;
a simulator configured to:
perform, based on the digital rock model and the digital fluid model, a plurality of simulations of the field by varying an input parameter value for the plurality of simulations;
a logic module configured to:
analyze an output parameter generated by the plurality of simulations to determine an effect of varying the input parameter value on the output parameter; and
a repository configured to store the digital rock model, the digital fluid model, and results of the plurality of simulations.

7. The computer system of claim 6, wherein the plurality of simulations simulates injecting fluid into the portion of the field and comprises:
representing a plurality of sections of the portion of the field by a plurality of digital rock model instantiations;
simulating a first section of the plurality of sections to generate a first effluent output, wherein the first section is simulated based at least on a first injection input and a first digital rock model instantiation of the plurality of digital rock model instantiations; and
simulating a second section of the plurality of sections to generate a second effluent output, wherein the second section is simulated based on the first effluent output and a second digital rock model instantiation of the plurality of digital rock model instantiations,
wherein a value of the output parameter generated by the plurality of simulations is based at least on the first effluent output and the second effluent output.

8. The computer system of claim 6, further comprising:
a display device configured to display the output parameter generated by the plurality of simulations in a statistical chart.

9. The computer system of claim 6, the logic module further configured to:
determine, based on the effect of varying the input parameter value on the output parameter meeting a pre-determined criterion, a laboratory test condition,
wherein the laboratory test condition is applied to a laboratory test on the core sample to generate a laboratory test result.

10. A non-transitory computer-readable medium comprising instructions for performing simulation of a field having a subterranean formation, the instructions when executed by a computer processor comprising functionality for:
obtaining a three-dimensional (3D) porous solid image of a core sample, wherein the core sample is a 3D porous medium representing a portion of the field;
generating a digital rock model from the 3D porous solid image, wherein the digital rock model describes a physical pore structure in the 3D porous medium;
obtaining phase behavior data of fluids of the field;
generating a digital fluid model of the fluids based on the phase behavior data, wherein the digital fluid model describes a physical property of the fluid;
performing, based on the digital rock model and the digital fluid model, a plurality of simulations of the field by varying an input parameter value for the plurality of simulations;
analyzing an output parameter generated by the plurality of simulations to determine an effect of varying the input parameter value on the output parameter; and
performing or modifying a field operation based on the effect of varying the input parameter value on the output parameter, wherein the field operation is well planning, well targeting, well completion, operating levels, or production rates.

11. The non-transitory computer-readable medium of claim 10, wherein the plurality of simulations simulates injecting fluid into the portion of the field and comprises:
representing a plurality of sections of the portion of the field by a plurality of digital rock model instantiations;
simulating a first section of the plurality of sections to generate a first effluent output, wherein the first section is simulated based at least on a first injection input and a first digital rock model instantiation of the plurality of digital rock model instantiations; and simulating a second section of the plurality of sections to generate a second effluent output, wherein the second section is simulated based on the first effluent output and a second digital rock model instantiation of the plurality of digital rock model instantiations, wherein a value of the output parameter generated by the plurality of simulations is based at least on the first effluent output and the second effluent output.

12. The non-transitory computer-readable medium of claim 10, the instructions when executed by the computer processor further comprising functionality for:

displaying the output parameter generated by the plurality of simulations in a statistical chart.

13. The non-transitory computer-readable medium of claim 10, the instructions when executed by the computer processor further comprising functionality for:

determining, based on the effect of varying the input parameter value on the output parameter meeting a pre-determined criterion, a laboratory test condition; and performing a laboratory test on the core sample based on the laboratory test condition to generate a laboratory test result.

14. The non-transitory computer-readable medium of claim 10, wherein the field operation is well planning, well targeting, well completions, operating levels, production rates, drilling new wells, re-complete existing wells, and/or alter wellbore production.

* * * * *